US012462268B2

(12) United States Patent
Becerril-Arreola

(10) Patent No.: US 12,462,268 B2
(45) Date of Patent: Nov. 4, 2025

(54) METHOD FOR ASSESSING DISPARATE IMPACT IN INTERNET MARKETS

(71) Applicant: UNIVERSITY OF SOUTH CAROLINA, Columbia, SC (US)

(72) Inventor: Rafael Becerril-Arreola, Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 141 days.

(21) Appl. No.: 18/299,929

(22) Filed: Apr. 13, 2023

(65) Prior Publication Data

US 2023/0394513 A1 Dec. 7, 2023

Related U.S. Application Data

(60) Provisional application No. 63/349,678, filed on Jun. 7, 2022.

(51) Int. Cl.
*G06Q 30/02* (2023.01)
*G06Q 30/0201* (2023.01)
*G06Q 30/0203* (2023.01)
*G06Q 30/0204* (2023.01)

(52) U.S. Cl.
CPC ..... *G06Q 30/0206* (2013.01); *G06Q 30/0203* (2013.01); *G06Q 30/0205* (2013.01)

(58) Field of Classification Search
None
See application file for complete search history.

(56) References Cited

U.S. PATENT DOCUMENTS

| | | | | |
|---|---|---|---|---|
| 11,308,539 | B2* | 4/2022 | Grebenikof | H04L 63/0421 |
| 2022/0377084 | A1* | 11/2022 | Zhang | H04L 67/141 |

OTHER PUBLICATIONS

Agarwal et al., "Consumer Mobility and the Local Structure of Consumption Industries", National Bureau of Economic Research, Jul. 2017, Revised Jan. 2020, 71 pages.
Becerril-Arreola et al., "Effects of Income Distribution Changes on Assortment Size in the Mainstream Grocery Channel", Management Science, vol. 67, No. 9, Sep. 2021, 24 pages.

(Continued)

*Primary Examiner* — Alan Torrico-Lopez
(74) *Attorney, Agent, or Firm* — DORITY & MANNING, P.A.

(57) ABSTRACT

Disclosed methodology assesses the existence of disparate impact in internet markets that serve geographically dispersed consumers. Implementations of the method can collect unbiased offering (e.g., pricing and/or other fees and costs) data for a large number of products and geographic areas, so that marketing decisions, such as price, recommendations, and delivery fees can be matched to consumer demographic data from established sources such as censuses and large scale surveys. The combined data can then be used to investigate the presence and nature of disparate impact and can be used by internet platforms and retailers to audit their algorithms for disparate impact without collecting or holding the demographic data of their own users. Thus, a methodology is provided for the collection of data required to study the extent to which algorithms in internet markets may induce disparities across demographic consumer groups and whether disparities can be justified by valid interests.

23 Claims, 8 Drawing Sheets

(56) References Cited

OTHER PUBLICATIONS

Cavallo, Alberto, "Are Online and Offline Prices Similar?, Evidence from Large Multi-Channel Retailers", American Economic Review, vol. 107, 2017, 30 pages.
Charles et al., Rates for Vehicle Loans: Race and Loan Source:, American Economic Review: Papers & Proceedings, vol. 98; 2008, 9 pages.
Chen et al., "An Empirical Analysis of Algorithmic Pricing on Amazon Marketplace", In Proceedings of the 25$^{th}$ International Conference on World Wide Web, 2016, 11 pages.
Eisenhauer, Elizabeth, "In poor health: Supermarket redlining and urban nutrition", GeoJournal, vol. 53, 2001, 9 pages.
Hannak et al., "Measuring Price Discrimination and Steering on E-commerce Web Sites", In Proceedings of the 2014 conference on internet measurement conference, 2014, 14 pages.
Hupperich et al., "An Empirical Study on Online Price Differentiation", In Proceedings of the Eighth ACM Conference on Data and Application Security and Privacy, 2018, 8 pages.
Iordanou et al., "Who is Fiddling with Prices? Building and Deploying a Watchdog Service for E-commerce", In Proceedings of the Conference of the ACM Special Interest Group on Data Communication, 2017, 14 pages.
Lambrecht et al., "Algorithmic Bias? An Empirical Study of Apparent Gender-Based Discrimination in the Display of STEM Career Ads", Management Science, vol. 65, No. 7, Jul. 2019, 17 pages.
Lee, Timothy, "Web scraping doesn't violate anti-hacking law, appeals court rules", Ars Technica, 2019, 7 pages.
Lee, Timothy, "Court: Violating a site's terms of service isn't criminal hacking", Ars Technica, 2020, 8 pages.
Mikians et al., "Detecting price and search discrimination on the Internet", In Proceedings of the 11th ACM workshop on hot topics in networks, Oct. 29-30, 2012, 6 pages.
Morton et al., "Consumer Information and Discrimination: Does the Internet Affect the Pricing of New Cars to Women and Minorities?", Quantitative Marketing and Economics, vol. 1, 2003, 28 pages.
Neumann et al., "Frontiers: How Effective is Third-Party Consumer Profiling? Evidence from Field Studies", Marketing Science, vol. 38, No. 6, Nov. 2019, 10 pages.
Obermeyer et al., "Dissecting racial bias in an algorithm used to manage the health of populations", Science, vol. 366, 2019, 8 pages.
Talukdar, Debabrata, "Cost of Being Poor: Retail Price and Consumer Price Search Differences across Inner-City and Suburban neighborhoods", Journal of Consumer Research, Inc., vol. 35, Oct. 2008, 16 pages.
Trusov et al., "Crumbs of the Cookie: User Profiling in Customer-Base Analysis and Behavioral Targeting", Marketing Science, vol. 35, No. 3, May-Jun. 2016, 22 pages.
Vastel et al., "FP-CRAWLERS: Studying the Resilience of Browser Fingerprinting to Block Crawlers", Network and Distributed Systems Security (NDSS) Symposium 2020, Feb. 2020, 13 pages.
Zeber et al., "The Representativeness of Automated Web Crawls as a Surrogate for Human Browsing", In Proceedings of The Web Conference 2020, 12 pages.

\* cited by examiner

| Low-income proportion decile | Minority proportion decile | | | | | | | | | |
|---|---|---|---|---|---|---|---|---|---|---|
| | 1 | 2 | 3 | 4 | 5 | 6 | 7 | 8 | 9 | 10 |
| 1 | 39 | 46 | 40 | 48 | 42 | 39 | 36 | 27 | 43 | 72 |
| 2 | 67 | 50 | 55 | 48 | 24 | 41 | 34 | 35 | 56 | 53 |
| 3 | 50 | 44 | 43 | 51 | 46 | 51 | 42 | 36 | 46 | 21 |
| 4 | 41 | 49 | 56 | 46 | 37 | 33 | 39 | 53 | 34 | 31 |
| 5 | 59 | 59 | 42 | 48 | 34 | 18 | 58 | 44 | 45 | 28 |
| 6 | 59 | 40 | 31 | 52 | 30 | 42 | 22 | 36 | 29 | 10 |
| 7 | 45 | 55 | 48 | 48 | 28 | 36 | 45 | 31 | 27 | 22 |
| 8 | 59 | 65 | 58 | 20 | 44 | 46 | 42 | 38 | 37 | 38 |
| 9 | 47 | 60 | 60 | 43 | 38 | 18 | 43 | 52 | 31 | 44 |
| 10 | 48 | 49 | 28 | 33 | 31 | 48 | 29 | 46 | 36 | 41 |

| Statistic | Mean | St. Dev. | Min | Pctl(25) | Pctl(75) | Max |
|---|---|---|---|---|---|---|
| PRICE | 6.945 | 16.706 | 0.190 | 2.790 | 6.990 | 899.990 |
| AVINCK | 18.828 | 4.219 | 3.000 | 16.273 | 21.690 | 30.000 |
| PROPLOWINC | 0.052 | 0.029 | 0.010 | 0.030 | 0.080 | 0.100 |
| PROPBLACK | 0.083 | 0.164 | 0.000 | 0.003 | 0.072 | 0.983 |
| PROPHISP | 0.086 | 0.151 | 0.000 | 0.013 | 0.080 | 0.977 |
| PROPASIAN | 0.024 | 0.070 | 0.000 | 0.002 | 0.010 | 0.716 |

FIG. 3

| | PRICE | AVINC | PROPLOWINC | PROPBLACK | PROPHISP |
|---|---|---|---|---|---|
| PRICE | | | | | |
| AVINCK | -0.38 | | | | |
| PROPLOWINC | -0.22 | 0.59 | | | |
| PROPBLACK | -0.15 | -0.32 | -0.62 | | |
| PROPHISP | -0.26 | -0.23 | -0.44 | -0.16 | |
| PROPASIAN | -0.36 | 0.16 | 0.18 | -0.42 | 0.24 |

Note: $^*p<0.1$; $^{}p<0.05$; $^{*}p<0.01$

| | Sample: | | |
|---|---|---|---|
| | Full | Random | Recommended |
| | (1) | (2) | (3) |
| AVINCK | 0.001*** | 0.001*** | 0.001*** |
| | (0.0002) | (0.0002) | (0.0004) |
| PROPLOWINC | 0.041 | 0.315*** | −0.232*** |
| | (0.034) | (0.024) | (0.059) |
| PROPBLACK | 0.103*** | 0.117*** | 0.083*** |
| | (0.006) | (0.004) | (0.010) |
| PROPHISP | 0.053*** | 0.090*** | 0.004 |
| | (0.006) | (0.004) | (0.011) |
| PROPASIAN | 0.407*** | 0.523*** | 0.311*** |
| | (0.013) | (0.009) | (0.023) |
| Product fixed effects | Yes | Yes | Yes |
| Observations | 1,392,798 | 618,759 | 774,039 |
| Within $R^2$ | 0.001 | 0.011 | 0.0004 |
| Adjusted within $R^2$ | 0.001 | 0.011 | 0.0004 |
| Note: | | | *p<0.1; **p<0.05; ***p<0.01 |

FIG. 7

| | Number of zip codes: | | | | |
|---|---|---|---|---|---|
| | 4797 | 3198 | 2398 | 1199 | 600 |
| | (1) | (2) | (3) | (4) | (5) |
| AVINCK | 0.001*** | 0.001*** | 0.001*** | 0.002*** | 0.001*** |
| | (0.0002) | (0.0002) | (0.0002) | (0.0003) | (0.0004) |
| PROPLOWINC | 0.315*** | 0.328*** | 0.277*** | −0.011 | 0.636*** |
| | (0.024) | (0.030) | (0.035) | (0.048) | (0.076) |
| PROPBLACK | 0.117*** | 0.096*** | 0.118*** | 0.120*** | 0.083*** |
| | (0.004) | (0.005) | (0.006) | (0.008) | (0.012) |
| PROPHISP | 0.090*** | 0.077*** | 0.077*** | 0.056*** | 0.313*** |
| | (0.004) | (0.005) | (0.006) | (0.008) | (0.013) |
| PROPASIAN | 0.523*** | 0.492*** | 0.537*** | 0.445*** | 0.068* |
| | (0.009) | (0.012) | (0.014) | (0.021) | (0.039) |
| Product fixed effects | Yes | Yes | Yes | Yes | Yes |
| Observations | 618,759 | 398,692 | 306,029 | 153,457 | 75,814 |
| Within $R^2$ | 0.011 | 0.008 | 0.010 | 0.007 | 0.007 |
| Adjusted within $R^2$ | 0.011 | 0.008 | 0.010 | 0.007 | 0.007 |
| Note: | | | | | *p<0.1; **p<0.05; ***p<0.01 |

|  | Number of UPCs: | | | | |
|---|---|---|---|---|---|
|  | 18099 | 12066 | 9050 | 4525 | 2262 |
|  | (1) | (2) | (3) | (4) | (5) |
| AVINCK | 0.001*** | 0.001*** | 0.001*** | 0.001*** | 0.0005 |
|  | (0.0002) | (0.0002) | (0.0002) | (0.0004) | (0.0004) |
| PROPLOWINC | 0.318*** | 0.291*** | 0.319*** | 0.426*** | 0.074 |
|  | (0.024) | (0.029) | (0.036) | (0.054) | (0.053) |
| PROPBLACK | 0.117*** | 0.109*** | 0.114*** | 0.106*** | 0.096*** |
|  | (0.004) | (0.005) | (0.006) | (0.008) | (0.009) |
| PROPHISP | 0.090*** | 0.091*** | 0.087*** | 0.101*** | 0.081*** |
|  | (0.004) | (0.005) | (0.006) | (0.009) | (0.009) |
| PROPASIAN | 0.523*** | 0.538*** | 0.496*** | 0.588*** | 0.496*** |
|  | (0.009) | (0.011) | (0.014) | (0.022) | (0.022) |
| Product fixed effects | Yes | Yes | Yes | Yes | Yes |
| Observations | 618,759 | 412,628 | 312,305 | 155,012 | 74,005 |
| Within $R^2$ | 0.011 | 0.011 | 0.009 | 0.010 | 0.014 |
| Adjusted within $R^2$ | 0.011 | 0.011 | 0.009 | 0.010 | 0.014 |
| Note: | | | | \*p<0.1; \*\*p<0.05; \*\*\*p<0.01 | |

FIG. 8

| | | | | |
|---|---|---|---|---|
| AVGINC | 0.001** | -0.004** | -0.006** | -0.006** |
| | (0.0002) | (0.001) | (0.001) | (0.001) |
| INCGINI | -0.410* | 4.166** | 7.135** | 7.103** |
| | (0.190) | (1.147) | (1.244) | (1.244) |
| PROPBLACK | 0.155** | 1.287** | 1.582** | 1.590** |
| | (0.038) | (0.245) | (0.249) | (0.249) |
| PROPHISP | 0.410** | 2.522** | 2.530** | 2.546** |
| | (0.069) | (0.453) | (0.452) | (0.452) |
| PROPASIAN | 1.041** | 1.302~ | 0.819 | 0.816 |
| | (0.130) | (0.769) | (0.771) | (0.771) |
| PROPNATIVE | 0.219 | 3.996** | 3.890** | 3.895** |
| | (0.209) | (1.161) | (1.159) | (1.159) |
| Cost controls | | | Yes | Yes |
| Stores per capita | | | Yes | Yes |
| Online sales | | | | Yes |
| UPC F.E. | Yes | Yes | Yes | Yes |
| CBSA F.E. | No | Yes | Yes | Yes |
| Observations | 10,497 | 10,497 | 10,497 | 10,497 |
| (Within) Adj. $R^2$ | 0.021 | 0.009 | 0.013 | 0.013 |

Note: ~$p<0.1$; *$p<0.05$; **$p<0.01$

FIG. 9

| | | | | |
|---|---|---|---|---|
| AVGINC | 0.0005** | -0.005** | -0.006** | -0.006** |
| | (0.0001) | (0.001) | (0.001) | (0.001) |
| INCGINI | -0.331** | 3.319** | 5.304** | 4.671** |
| | (0.110) | (1.030) | (1.118) | (1.117) |
| PROPBLACK | 0.025 | -0.163 | 0.035 | 0.046 |
| | (0.022) | (0.220) | (0.224) | (0.223) |
| PROPHISP | 0.277** | -0.741~ | -0.736~ | -0.766~ |
| | (0.040) | (0.407) | (0.406) | (0.405) |
| PROPASIAN | 1.223** | 0.947 | 0.625 | 0.900 |
| | (0.075) | (0.690) | (0.693) | (0.691) |
| PROPNATIVE | -0.215~ | 1.829~ | 1.758~ | 1.786~ |
| | (0.121) | (1.043) | (1.042) | (1.038) |
| Cost controls | | | Yes | Yes |
| Stores Per cap | | | Yes | Yes |
| Online sales | | | | Yes |
| UPC F.E. | Yes | Yes | Yes | Yes |
| CBSA F.E. | No | Yes | Yes | Yes |
| Observations | 10,497 | 10,497 | 10,497 | 10,497 |
| (Within) Adj. $R^2$ | 0.021 | 0.009 | 0.013 | 0.013 |

Note: ~p<0.1; *p<0.05; **p<0.01

FIG. 10

|  | Less data | More data |
|---|---|---|
| AVGINC | -0.001 | -0.008** |
|  | (0.002) | (0.002) |
| INCGINI | 1.256 | 10.685** |
|  | (1.839) | (1.820) |
| PROPBLACK | 0.906** | 2.915** |
|  | (0.316) | (0.430) |
| PROPHISP | 2.989** | 1.103 |
|  | (0.508) | (1.040) |
| PROPASIAN | 0.881 | 2.565 |
|  | (0.926) | (1.891) |
| PROPNATIVE | 6.885** | -1.183 |
|  | (1.423) | (1.975) |
| All controls | Yes | Yes |
| UPC F.E. | Yes | Yes |
| CBSA F.E. | Yes | Yes |
| Observations | 5,248 | 5,248 |
| (Within) Adj. $R^2$ | 0.010 | 0.057 |

Note: *p<0.1; p<0.05; *p<0.01

FIG. 11

METHOD FOR ASSESSING DISPARATE IMPACT IN INTERNET MARKETS

PRIORITY CLAIM

The present application claims the benefit of priority of U.S. Provisional Patent Application No. 63/349,678, titled METHOD FOR ASSESSING DISPARATE IMPACT IN INTERNET MARKETS, filed Jun. 7, 2022, and which is fully incorporated herein by reference for all purposes.

BACKGROUND OF THE PRESENTLY DISCLOSED SUBJECT MATTER

The presently disclosed subject matter relates to methodology for assessing disparate impact in internet markets.

Previous work has studied brick-and-mortar retailers to reveal that local food availability and prices correlate with local consumer income [1, 5, 17] and other demographics. The leading role of brick-and-mortar retailers is, however, increasingly contested by online retailers, which do not share their data with researchers as brick-and-mortar retailers do. For this reason, the research on disparate impact in online retailing is limited. This is an important omission because the online and offline shopping environments differ greatly and therefore existing insights from offline markets may not apply to online markets.

In particular, online markets allow retailers to personalize prices based on the digital fingerprints and browsing behaviors of consumers [e.g., 7, 12]. [12] found evidence that a retailer of office supplies personalized prices based on shopper location. [6] developed an approach to assess price personalization among several online travel agencies, car rental companies, and several major retailers, finding that only one major retailer personalized prices based on the operating systems of shoppers. [7] developed a similar methodology to assess price personalization of online travel agencies across countries and found no clear evidence of price discrimination. [8] collected price data from a number of online retailers and found evidence of price differences across individual shoppers, but also found that such differences were caused by NB testing rather than price personalization. In other background examples, Orbitz steered Mac users to higher cost offerings, Facebook was sued by HUD for allowing advertisers to use demographic filters, Wells Fargo paid millions in multiple lawsuits related to redlining, and Apple card offered smaller lines of credit to women than to men. Thus, disparate impact can be bad for businesses.

While some of such studies have found evidence of price discrimination, they have not focused on necessary goods (such as groceries) and have not related price differences to consumer demographics. That is, no empirical research on personalization has yet studied how pricing algorithms may subject different consumer groups to disparate impact in the context of necessary goods. Groceries require special attention because they are necessities and because of their high delivery and shopping costs [13].

In some instances, as a strategy to avoid lawsuits, companies are building teams to assess fairness of algorithms. Discrimination under consideration can be of different types. For example, discrimination can broadly be referenced as differences in outcomes across demographically different individuals or groups that have no business justification. Discrimination can cause disparate impact (DI). Two recognized forms of discrimination may include (1) Disparate treatment—Applying different standards to different groups of individuals, or (2) Disparate impact—Applying same standards across groups, but obtaining differences in outcomes.

In conjunction with establishing D.I, broadly considered, it may be observed that a Plaintiff need only provide evidence of disparity and causal connection to policy, while a Defendant must show that the challenged policy is needed to achieve a valid interest (i.e., policy is a business necessity). In such instance, a Plaintiff may have to show valid interest achievable in less impactful manner. From formulated research question perspectives, questions may include such as (1) Does algorithmic pricing induce disparate impact across geographies in online retailing, (2) If so, what explains the disparity, (3) is there a valid interest.

SUMMARY OF THE PRESENTLY DISCLOSED SUBJECT MATTER

Aspects and advantages of the presently disclosed subject matter will be set forth in part in the following description, or may be apparent from the description, or may be learned through practice of the presently disclosed subject matter.

Broadly speaking, the presently disclosed subject matter relates to methodology for assessing disparate impact in internet markets.

The presently disclosed subject matter in some presently disclosed embodiments is a method for assessing the existence of disparate impact in internet markets that serve geographically dispersed consumers. Implementations of the method can collect unbiased offering data for a large number of products and geographic areas, so that business decisions, such as price, recommendations, and delivery fees, can be matched to consumer demographic data from established sources such as censuses and large-scale surveys. The combined data can then be used to investigate the presence and nature of disparate impact and can be used by internet platforms and retailers to audit their algorithms without collecting or holding the demographic data of their own users.

One presently disclosed exemplary methodology preferably relates to methodology for the collection of data required to study the extent to which pricing algorithms in internet markets may induce disparities across demographic consumer groups, without collecting or storing the demographic data of the internet market consumers. Such methodology preferably comprises providing a first internet crawler or artifact comprising one or more processors programmed to: open a targeted retailer's main web page and then recursively crawl through all products in at least one selected category of products, build a tree of all products available in the at least one selected category, and collect and store the https addresses of the product pages of all products in the at least one selected category; and providing a second internet crawler or artifact comprising one or more processors programmed to: receive the collected https addresses of the product pages from the first artifact, and collect and store pricing data from a relatively large number of a plurality of locations of the targeted retailer, for the stored pricing data associated with the respective plurality of locations of the targeted retailer to be subsequently analyzed for disparate impact (DI).

One presently disclosed exemplary methodology preferably relates to methodology to assess the existence of disparate impact in internet markets that serve geographically dispersed consumers, by impersonating the geographically dispersed consumers to elicit and capture the behaviors of algorithms on large scale for statistical analysis, without collecting or storing the demographic data of the internet market consumers. Such methodology preferably comprises providing first and second internet crawlers or artifacts comprising one or more processors programmed to automate page requests and navigation relative to at least one targeted online retailer in ways that mimic the typical browsing behaviors of real consumers in a respective plurality of locations; wherein the one or more processors comprising the first artifact are further programmed to: open a targeted retailer's main web page and then recursively crawl through all grocery products in all available categories of grocery products, build a tree of all grocery products available in all available categories, and collect and store the https addresses of the product pages of all grocery products in all available categories; and the one or more processors comprising the second artifact are further programmed to operate in a first mode to: receive the collected https addresses of the grocery product pages from the first artifact, select a random set of categories from all of the available categories from the first artifact, select random grocery products from within each of the selected random set of categories, open the targeted retailer's main web page and then recursively crawl through all randomly selected grocery products in the randomly selected set of available categories of grocery products, and collect and store offering data for each of the randomly selected grocery products of the targeted retailer browsing as if from the respective plurality of locations, wherein the respective plurality of locations comprise a relatively large number of relatively small geographic areas respectively associated with zip codes; and the methodology further comprises providing one or more analysis processors programmed to respectively match the zip code associated stored offering or pricing data with public data sources of consumer demographic data for the corresponding zip codes to be subsequently analyzed for disparate impact (DI).

It is to be understood from the complete disclosure herewith that the presently disclosed subject matter equally relates to both methodology and corresponding and/or related apparatuses or systems.

Other example aspects of the present disclosure are directed to systems, apparatus, tangible, non-transitory computer-readable media, user interfaces, memory devices, and electronic smart devices or the like. To implement methodology and technology herewith, one or more processors may be provided, programmed to perform the steps and functions as called for by the presently disclosed subject matter, as will be understood by those of ordinary skill in the art.

One presently disclosed exemplary embodiment relates to an electronic platform for the collection of data required to study the extent to which pricing algorithms in internet markets may induce disparities across demographic consumer groups, without collecting or storing the demographic data of the internet market consumers. Such electronic platform preferably comprises a first artifact comprising one or more processors programmed to: open a targeted retailer's main web page and then recursively crawl through all products in at least one selected category of products, build a tree of all products available in the at least one selected category, and collect and store the https addresses of the product pages of all products in the at least one selected category; a second artifact comprising one or more processors programmed to: receive the collected https addresses of the product pages from the first artifact, and collect and store pricing data from a relatively large number of a plurality of locations of the targeted retailer respectively associated with zip codes, for the stored pricing data associated with the respective zip codes to be subsequently analyzed for disparate impact (DI); and one or more analysis processors programmed to respectively match the zip code associated stored pricing data with public data sources of consumer demographic data for the corresponding zip codes. Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the Figures or stated in the detailed description of such Figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

BRIEF DESCRIPTION OF THE FIGURES

A full and enabling disclosure of the presently disclosed subject matter, including the best mode thereof, directed to one of ordinary skill in the art, is set forth in the specification, which makes reference to the appended Figures, in which:

FIG. 3 illustrates a table of descriptive statistics of raw data of variables in the data set considered in the exemplary methodology per presently disclosed subject matter;

FIG. 4 illustrates a table of correlations among variables of the table of FIG. 3;

FIG. 6 illustrates a table of the relationship between product prices and demographic variables per the data set considered per presently disclosed subject matter;

FIG. 7 illustrates a table of the selection of the number of geographies in the subject sample data set;

FIG. 8 illustrates a table of the selection of the number of products in the subject sample data set;

FIG. 9 illustrates a table of the relationship between product prices and demographic variables from another data set considered per presently disclosed subject matter, with the table representing aggregation at the zip3 level (the first three digits of the 5-digit ZIP code);

FIG. 10 illustrates a table of the relationship between product prices and demographic variables from another data set considered per presently disclosed subject matter, with the table representing aggregation at the same zip3 level as in FIG. 9 (the first three digits of the 5-digit ZIP code) but with all analysis replicating data from brick-and-mortar prices instead of internet pricing; and FIG. 11 illustrates a table of the relationship between product prices and demographic variables from another data set considered per presently disclosed subject matter, with the table representing use of online sales per capita as a proxy for data volume, and with the sample split as represented in the table.

Figures 1, 2:
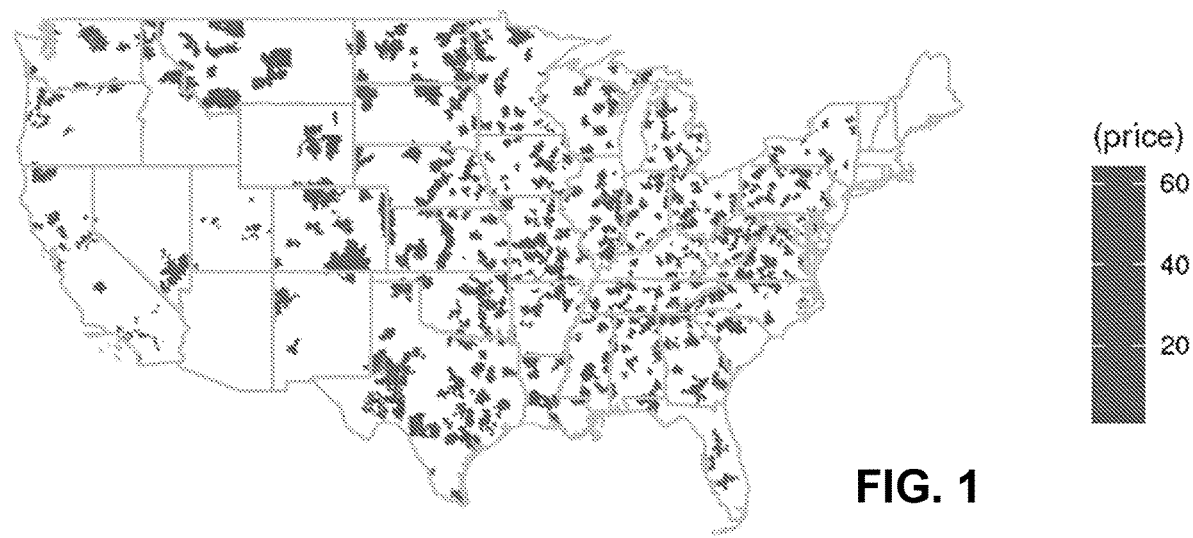
FIG. 1 illustrates an augmented US map including in graphic representation the average prices across all products sampled in each zip code considered in the exemplary methodology per presently disclosed subject matter.
FIG. 2 illustrates a table of the frequency of zip codes selected by deciles of minority and low-income proportions associated with the subject matter of FIG. 1.

Repeat use of reference characters in the present specification and drawings is intended to represent the same or analogous features or elements or steps of the presently disclosed subject matter.

DETAILED DESCRIPTION OF THE PRESENTLY DISCLOSED SUBJECT MATTER

It is to be understood by one of ordinary skill in the art that the present disclosure is a description of exemplary embodiments only, and is not intended as limiting the broader aspects of the disclosed subject matter. Each example is provided by way of explanation of the presently disclosed subject matter, not limitation of the presently disclosed subject matter. In fact, it will be apparent to those skilled in the art that various modifications and variations can be made in the presently disclosed subject matter without departing from the scope or spirit of the presently disclosed subject matter. For instance, features illustrated or described as part of one embodiment can be used with another embodiment to yield a still further embodiment. Thus, it is intended that the presently disclosed subject matter covers such modifications and variations as come within the scope of the appended claims and their equivalents.

The present disclosure is generally directed to improved methodology for assessing disparate impact in internet markets.

Reference will now be made in detail to various embodiments of the disclosed subject matter, one or more examples of which are set forth below. Each embodiment is provided by way of explanation of the subject matter, not limitation thereof.

Disclosed relating to one presently disclosed exemplary embodiment is a method for the collection of data that can be used to reliably assess the fairness of automated decisions made by computer algorithms in internet markets (e.g., service platforms such as Uber® or online retailers such as walmart.com). The presently disclosed approach impersonates consumers to elicit and capture the behaviors of algorithms on a large scale, so the data collected are large and rich enough to draw reliable conclusions.

The innovation is a method for assessing the existence of disparate impact in internet markets that serve geographically dispersed consumers. Implementations of the method can collect unbiased offering data for a large number of products and geographic areas, so that marketing decisions, such as price, recommendations, and delivery fees, can be matched to consumer demographic data from established sources such as censuses and large-scale surveys. The combined data can then be used to investigate the presence and nature of disparate impact and can be used by internet platforms and retailers to audit their algorithms without collecting or holding the demographic data of their own users.

To illustrate this, a platform was built to implement the method and collect prices from one major retailer in the United States. The platform collected data for 18,303 different grocery products in more 7,171 randomly selected zip codes. The data collected indicates that the higher the prices, the higher local income inequality is and the higher the proportions of minority consumers are.

This method can be used for a variety of applications including, but not limited to, helping businesses evaluate the fairness of their algorithms without forcing them to collect and store consumer demographic data. Companies increasingly use computer algorithms to make automatic business decisions (e.g., prices) and personalize these decisions for each consumer. Algorithms, however, may unknowingly learn to discriminate consumers on basis of their gender, race, socioeconomic status, etc. Yet, it is difficult and risky to evaluate algorithms, partly because collecting and holding demographic data can be a liability for businesses. The disclosed embodiment can alleviate this liability by using algorithms that do not collect and store consumer demographic data.

The disclosed innovation could be licensed to big firms or to consulting companies serving smaller internet firms that cannot afford an in-house team of specialists. According to the 2022 Business Patterns survey of the U.S. Census Bureau, there were 47,915 electronic shopping and mail-order houses, of which 5912 have between 10 and 100 employees and annual payrolls above $2,000,000. Not all of these are internet companies, however the count does not include business with both internet and brick-and-mortar channels (e.g., companies such as Walmart® and Whole Foods®).

This presently disclosed subject matter presents methodology for assessing the existence of disparate impact in internet markets that serve geographically dispersed consumers. Implementations of the method can collect unbiased offering data for a large number of products and geographic areas, so that marketing decisions, such as price, recommendations, and delivery fees can be matched to consumer demographic data from established sources such as censuses and large scale surveys. The combined data can then be used to investigate the presence and nature of disparate impact and can be used by internet platforms and retailers to audit their algorithms without collecting or holding the demographic data of their own users.

Existing firms dedicated to the testing of algorithms are staffed by professionals with technical background (mathematician, statisticians, computer scientists), who often lack the business expertise to deeply understand all the business contexts in which algorithms have been embedded. They take on all kinds of projects, although current demand is strongest for hiring, housing, and credit decisions because those are the areas that are currently regulated. The presently disclosed innovation instead has an initial focus on consumer markets (e.g., online retailing) and embeds substantive knowledge of retailing and consumer behavior.

In addition, available solutions require internal data and full collaboration from the firms being audited. This imposes burden on the firms, which must allocate internal resources to support the fairness assessments. In contrast, the presently disclosed innovation uses public data rather than internal data. Therefore, the conclusions it generates may be safer and more credible. The firms being evaluated need to allocate resources or be concerned about collecting and storing demographic data (which may create liabilities).

1 Introduction

This presently disclosed subject matter presents a new methodology for the collection of data required to study the extent to which algorithms in internet markets may induce disparities across demographic consumer groups. Previous studies have proposed methods to collect retailing data at the country level to assess the prevalence of price personalization [2, 6, 7, 12]. In contrast, the presently disclosed approach collects data across a large number of small geographic areas (i.e., zip codes). The collected retailing data can therefore be large, rich in variation, and can be matched with common sources of consumer demographic data (e.g., censuses and large-scale surveys). To illustrate the presently disclosed methodology, the presently disclosed subject matter also presents the results of an analysis of data collected from a leading retailer that is well known to use algorithmic pricing. This analysis provides evidence of disparate impact across income and racial groups.

The insights generated and the research design contribute to the literature that has empirically studied the fairness of algorithms in consumers markets other than online retailing [e.g. 9, 16]. In contrast to studies in that literature, this present disclosure focuses on online grocery retailing and therefore addresses complex measurement challenges inherent to online environments. In particular, online retailers often implement defense mechanisms to prevent the auditing of their decisions and therefore data collected with standard web crawlers can be biased or simply unavailable. This present disclosure therefore also adds to the literature that develops technologies for the assessment of the effects of algorithmic decision making in online markets [e.g., 4, 6, 7, 12]. Existing work in this area has focused on developing software technologies that can reliably collect data to assess the possibility that online retailing algorithms may induce disparate treatment. The presently disclosed subject matter has allowed researchers to identify cases of price discrimination but have not established an association between automated decisions, such as prices, and consumer demographics. The approach presently disclosed here, in contrast, does allow researchers to empirically establish a link between personalization and the consumer demographics that define some protected groups. Finally, the results also contribute to the broader literature that has studied disparities and discrimination in other consumer markets without emphasizing the role of computer algorithms [e.g., 1, 3, 14, 17].

It is to be understood by those of ordinary skill in the art that what is described herewith operationally as for example two crawlers, could be very easily implemented as a single crawler. Therefore, to generically encompass all such variations which functionally and equivalently perform the same features of the present disclosure, reference is more broadly made in certain instances to artifacts or components, or two artifacts or components that could readily be implemented independently, separately, or in a larger number of smaller components. The components could be, for example, separate software routines executed on any number of computers, with such details forming no particular part of the presently disclosed subject matter. Similarly, it is to be understood that the one or more processors comprising a first artifact or a second artifact, and/or the one or more analysis processors as described herein may in various implementations actually comprise collectively a single processor or group of designated processors, in different combinations programmed for performing the functions of the analysis and/or first artifact and/or second artifact as described herein. All such variations are intended as coming with the spirit and scope of the subject matter disclosed herewith.

2 Methodology

As in previous studies [e.g., 2, 6, 7], data are collected by web crawlers that comply with the Computer Fraud and Abuse Act (CFAA). Web crawling has been ruled legal for both academic [11] and commercial purposes [10].

2.1 Research Design

Data are collected at the zip code and universal product code (UPC) level. Grocers carry millions of UPCs [see 1] and there are over 40,000 zip codes in the United States. One must therefore use sampling techniques. The collected sample must exhibit enough variation in consumer demographics across zip codes to ensure that the effects of consumer demographics on prices can be empirically identified. We must therefore oversample zip codes with relatively large proportions of minority households because minorities are by definition under-represented in the population.

Data is used from the U.S. Census Bureau and the U.S. Internal Revenue Service (IRS) to compute the proportion of minority and low-income households in each zip code. The proportion of minority households is to this end defined as one minus the proportion of White households. The proportion of low-income households is defined as the proportion of households that report adjusted gross income in the lowest bracket defined by the IRS. Each zip code is assigned a weight that is proportional to the zip code's proportions of minority and low-income households. Random samples are taken from all the country zip codes with the computed weights.

FIG. 1 illustrates an augmented US map including in graphic representation the average prices across all products sampled in each zip code considered per presently disclosed subject matter. The final sample as presented graphically in FIG. 1 includes 7326 distinct zip codes to account for 15% of the U.S. population. These zip codes are relatively evenly distributed in terms of their proportions of minority and low-income households, as shown in FIG. 2. In other words, FIG. 2 illustrates a table of the frequency of zip codes selected by deciles of minority and low-income proportions associated with the subject matter of FIG. 1. A perfectly uniform distribution is not possible with sampling without replacement because the proportions of minority and low-income households are not statistically independent.

The final sample of zip codes was used as a pool, from which one zip code was randomly selected with replacement repeatedly from August to October 2021. Each of these zip codes became the focal zip code of an independent browsing session. For each session, the surrounding zip codes of the focal zip code were identified, three product categories and 20 of their products were randomly selected without replacement (so as to mimic consumer browsing behaviors). Price data was collected for all combinations of the products and the focal and surrounding zip codes.

The collection of data from neighboring zip codes is of great importance because it makes the data suitable for the analysis of valid interests. This feature of the sampling design allows the data to capture relevant economic features of the grocery industry that are associated with business necessities, such as transportation and labor costs. This feature of the sampling design allows the researcher to isolate variation in business decisions, such as prices, that cannot be justified by such business necessities. Understanding the reasons behind observed disparities is necessary for business and policy decision making. For this reason, the proposed methodology can be used to support legal frameworks such as Title VII of the 1964 Civil Rights Act of the U.S., which establishes that disparate impact can be justified as a business necessity. This feature distinguishes the proposed methodology from previous approaches.

2.2 the Platform

Two different crawlers were coded using python. The website of the retailer of interest serves web pages using dynamic html. Accordingly, the crawlers automate page requests and navigation in ways that mimic the typical browsing behaviors of real consumers.

The first crawler was programmed to open the retailer's main web page and then recursively crawl through all products in the grocery department, building a tree of all products available in all grocery categories and collecting the https addresses of the product pages. To build a comprehensive product list in a feasible collection time, the process was performed for nine of the largest stores of the chain in diverse geographies across the country. Larger stores carry bigger assortments, making unnecessary collecting data for thousands of smaller stores. The geographic diversity of the stores should account for most regional differences in product assortments. To avoid contamination of measurements across locations, each store was visited with a different browser instance. This crawler ran every two weeks on average to capture seasonal changes in the assortment of the retailer.

The second crawler collected pricing data across locations. Independent threads ran asynchronously in parallel. Each thread selected a focal zip code at random from the pool and identified its neighboring zip codes. For each focal zip code a new browser session was created, selecting either Firefox or Chromium at random with equal probabilities. After collecting data for the selected categories and products, the crawler closed the browser, deleting its browsing history and cookies.

The second crawler worked in two different modes. In the first mode, the second crawler collected data to assess pricing policies independently of product recommendations. To this end, the second crawler read the latest output from the first crawler, selecting a set of random categories, then random products within each category. Next, the crawler loaded the page of each of the selected products and selected one retailer location by searching for the store closest to a focal zip code. The crawler collected the price of the product at that particular location and then proceeded to similarly collect the prices of the product at the zip codes surrounding the focal zip code.

In the second mode, the second crawler collected data to assess whether the zip code determined what products consumers were steered to. To this end, the second crawler read the names of the categories produced by the first crawler and randomly selected a subset. The crawler entered each category name in the search box and clicked on the search button, emulating consumer searches. The crawler created a list of the top search results and loaded their pages, one at a time. For each product, the crawler selected the retailer location by searching for the store closest to a focal zip code also selected at random from the pool. The crawler collected the price of the product at that particular location and then proceeded to similarly collect the prices of the product at the zip codes surrounding the focal zip code.

Because navigation of the website was complex, the code had to rely on the idiosyncratic structure and code of the retailer's website. For instance, to select a store for a given zip code, the crawler had to first open a store search dialog box, then enter the desired zip code, click on the search button, and wait for a list of stores to be displayed. The crawler would then read the displayed options and determine whether the closest store was already selected. If not, then the crawler would select the store nearest to the desired zip code. Through this process, the crawler had to handle delays and exceptions that occur frequently, such as the emergence of pop-ups that obscured buttons making them non-clickable (the retailer uses pop-ups that cannot be blocked by traditional means).

Up to 30 browsing sessions ran in parallel using multi-threading on a Linux machine with 24 cores and 128 GB of memory. The program was restarted weekly to free memory lost through leaks that affect the Firefox browser. The system was located within an institutional network that provided access to high-speed internet.

2.3 Measurement

For crawlers to collect valid information with sufficient identifying variation, they must be able to impersonate consumers from different locations and different demographic groups. This imply that detection needs to be avoided. There is evidence that some websites treat human visitors and crawlers differently [20]. In general, retailer websites may detect crawlers by collecting "stateless" information (such as browser and computer characteristics) as well as "stateful" information (such as browsing histories). Stateless information is often collected through fingerprinting, which is the process of collecting user profile data like browser, Operating System, and IP (Internet protocol) addresses. Stateful information is often collected through client-side cookies, but can also be obtained by other means facilitated by fingerprinting [18]. Fingerprinting allows websites to identify users uniquely and track their online behavior across sessions and across websites [15]. Even if consumers delete browser cookies, fingerprinting allows websites to build complete browsing histories (i.e., supercookies) by complementing the information collected by the websites with data from third-party trackers. Using both stateless and stateful information, websites can differentiate human visitors and crawlers. In addition, websites may analyze browsing behaviors to search for regular patterns. Automated crawlers need to replicate the same browsing patterns to collect sufficient data, whereas consumers have no motivation to repeat their actions following fixed sequences and at regular time intervals.

Although many websites use some mix of stateless and stateful information to detect and block web crawlers, knowledge of the type of information collected by a particular website can enable a crawler to bypass detection [19]. Repeated testing revealed that the retailer studied here collected a limited set of fingerprints and assessed the regularity of browsing behaviors (e.g., requests were refused when their sequences were regularly timed and their frequency high). The browsers were configured so as to curve fingerprinting by, for example, editing http headers and disabling access to the Graphics Processing Unit. Pattern detection was avoided by introducing random delays between requests and by introducing random behaviors such as random scrolling of the pages navigated.

These measures were sufficient to avoid detection during the data collection period. More recently, the targeted retailer implemented more advanced detection measures and stopped serving pricing data to the computer's IP address. This problem has been circumvented using residential proxies. The fingerprint was held constant: the IP address was the same and the user agent differed only depended on whether the crawler was working with Chromium or Firefox. Because cookies were session-specific, each browsing session was associated with a random browsing history. Stateless and stateful information were therefore constant or orthogonal to geographic differences and unlikely to induce correlations between prices and the choice of zip code provided to the retailer.

3 Application

3.1 Data

The price data collected is summarized graphically in FIG. 1 and indicates that the average price of all products sampled varies significantly across zip codes. Furthermore, there is variation not only across regions but also within states and even within CBSA's.

To assess whether prices are correlated with consumer demographics, data is used from the U.S. Census Bureau and the IRS. The Census bureau provides zip code-level data on the average income, the number of households by ethnicity, and the total number of households units. Combined, these figures yield the proportions of households reported as African American (PROPBLACK), Hispanic (PROPHISP), Asian (PROPASIAN), and the average income in thousands of dollars (AVINCK). The IRS provides zip code-level data on the total number of tax returns and the number of tax returns by adjusted gross income (AGI) brackets. The proportion of returns reporting AGI below $25,000 is computed and regard it as the proportion of low-income consumers (PROPLOWINC).

The descriptive statistics of the raw data appear in FIG. 3. More specifically, FIG. 3 illustrates a table of descriptive statistics of raw data of variables in the data set considered per presently disclosed subject matter;

The data set includes some expensive items that the retailer recommended, such as pantry furniture. Other expensive items included cookie and cold cuts gift sets, which were sometimes priced between $100 and $200 USD. FIG. 4 illustrates a table of correlations among variables of the table of FIG. 3. The correlations which appear in FIG. 4 are all below 0.60. None is statistically significant.

3.2 Main Results

3.2.1 Model-Free Results

To assess disparate impact across demographic groups defined by income and race, the sample is split at the median of each demographic variable and label observations in each group as either "low" or "high." For example, when splitting on average income, observations in the "low" group correspond to zip codes with average income below the median. Observations in the "high" group correspond to zip codes with above-median average income. Then the average product price is computed for each group.

Figure 5:
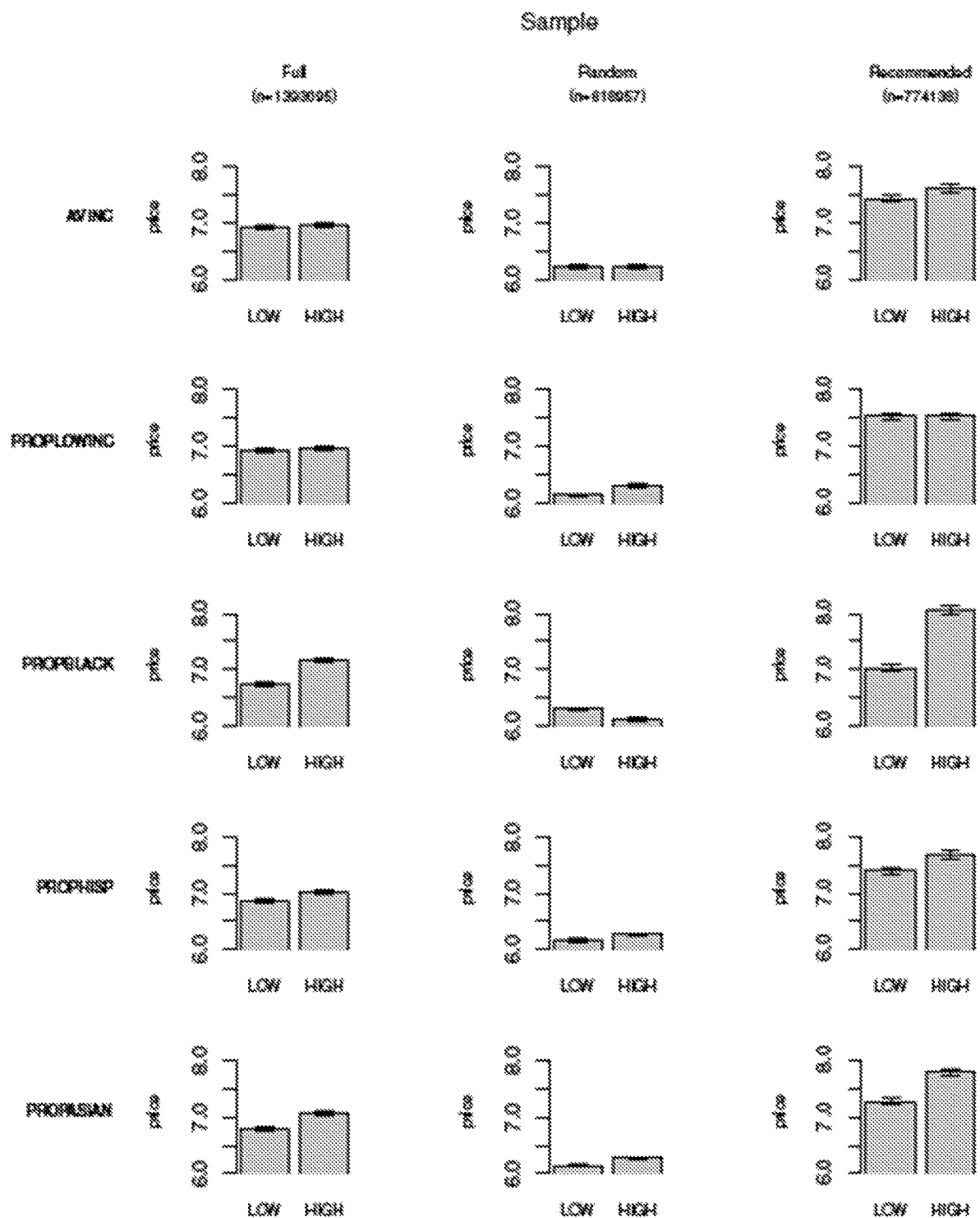
FIG. 5 graphically illustrates average prices by demographic group, from the data set considered per presently disclosed subject matter.

FIG. 5 graphically illustrates average prices by demographic group, from the data set considered per presently disclosed subject matter. "Low" represents observations below the median of the demographic variable, while "High" represents observations above the median. The whiskers represent the 95% confidence intervals of the means.

The average prices and their 95% confidence intervals are presented graphically in the leftmost column of FIG. 5. There is no clear difference in prices across zip codes with different levels of average income nor across zip codes with different proportions of low income households. There is, in contrast, a clear difference across zip codes with different proportions of minority consumers. On average, prices are about $0.50 USD, $0.20 USD, and $0.25 USD higher for zip codes with above median proportions of Blacks, Hispanics, and Asians, respectively, than for zip codes with below median proportions of the same minorities.

It is, however, unclear to what extent price differences are explained by within-product price variation and how much by price steering (the practice of recommending more expensive products to particular shoppers). To explore this question, the sample is split to separate observations according to the crawler mode in which they were collected. The first set is restricted to observations collected by randomly selecting products from the pool. Hence this sample is referred to as "random." The second set is restricted to observations collected from the top recommendations made by the retailer's recommendation system. Hence, this sample is referred to as "recommended."

As before, each sample is split by the median values of the demographics and compute the average price for each group. Results for the "random" sample appear in the middle column of FIG. 5. Results for the "recommended" sample appear in the rightmost column of the same figure. A first noticeable difference is that prices are overall lower for the random sample than for the recommended sample. This indicates that the retailer indeed practices price steering across all demographic groups. Results for the random sample indicate that actual prices are higher for zip codes with high proportions of low-income, Hispanic, and Asian households. Prices actually appear to be lower for zip codes with higher proportions of Black households. Yet, price steering is the most extreme for these same Black households, with recommendations being on average about $1.00 USD higher for zip codes with high proportions of these households. The recommendation system also recommends more expensive products in zip codes with above median average income and above median proportions of Hispanic and Asian households.

3.2.2 Regression Analysis

The model-free results are informative, but the plots cannot fully separate the effects of the different demographics because some are correlated. Furthermore, the retailer may localize the assortments and that may influence the average prices even if the price of each product is the same across geographies. To quantify the price differences associated with a particular demographic variable while holding constant product assortment and other demographics, one needs to resort to multiple regression analysis. In particular, a regression model is estimated that explains product prices as a function of consumer demographics. The model specification is:

$$\text{PRICE}_{zj} = \tau_j + \beta_1 \text{AVINCK}_z + \beta_2 \text{PROPLOWINC}_z + \beta_3 \text{PROPBLACK}_z + \beta_4 \text{PROPHISP}_z + \beta_5 \text{PROPASIAN}_z + \epsilon_{zj} \quad \text{(Eq. 1)}$$

where z indexes zip codes and j indexes UPCs. The parameters $\tau_j$, are product-specific fixed effects that account for the variation in prices that is associated with the products available locally. These fixed effects absorb differences across products that are constant across geographies, so that the other model parameters measure the variation within products and across geographies. The income variables PROPLOWINC and AVINCK are both included to capture both the location and shape of the distribution of income.

FIG. 6 illustrates a table of the relationship between product prices and demographic variables per the data set considered per presently disclosed subject matter. The estimates appear in Column (1) of FIG. 6 and indicate that consumers living in zip codes with high average income see higher prices than those living in zip codes with low average income. The estimates also indicate that geographies with high proportions of all three minority groups see prices that are on average higher than those offered to consumers living in less diverse zip codes.

The estimates in Column (1) of FIG. 6, again, do not explain how much price differences are associated with within-product price variation and how much by price steering. To separate the effects of the pricing algorithm from those of the recommendation system, the sample is split into the set of products selected randomly from the pool and the set of products recommended by the retailer's recommendation system. Then the regression model (1) is re-estimated using each of the samples and report the results in Columns (2) and (3) of FIG. 6.

As per the estimates reported in Column (2) of FIG. 6, in the random sample, prices are higher when both average income and the proportion of low-income households is high. This implies that the pricing algorithm sets prices that are positively correlated with income inequality. The remaining estimates in Column (2) are very similar, but larger than those reported in Column (1). This implies that the pricing algorithm is, at least partly, responsible for prices being higher for zip codes with high proportions of minority consumers.

The results reported in Column (3) of FIG. 6 show that consumers in high average income zip codes are steered to slightly more expensive products, while consumers with high proportions of low-income households are steered to significantly less expensive products. Zip codes with high proportions of Black and Asian consumers are steered to more expensive products.

3.3 Sample Size Selection

Implementing the auditing platform requires deciding the sample size, or the number of geographies, the number of products to include, and the number of measurements per each geography-product combination. These decisions are important because they determine the amount of variation in the data and therefore the ability of the analyses to identify the focal correlations between consumer demographics and prices. In particular, the most important source of variation for the assessment of disparate impact is variation across geographies because geographic variation is required to observe demographic variation. It is also important to measure variation across products because product assortments vary geographically and it is important to separate variation in assortments from variation in prices. The number of measurements per geography-product combination is of less concern because variation within geography-product combinations is associated with processes such as seasonality and NB testing, which are unlikely correlated with consumer demographics.

To focus on algorithmic pricing, the following analyses rely on the "random" sample or products and omit the observations associated with the retailer's recommendation system. The analyses likewise rely on the regression model in Eq. (1), which controls for assortment localization with fixed effects.

The first set of analyses focuses on the selection of the number of geographies. The set of all unique zip codes in the data set is identified and draw from it five random samples of different sizes. All observations are selected associated with those random samples of zip codes. FIG. 7 illustrates a table of the selection of the number of geographies in the subject sample data set. The estimation results that appear in FIG. 7 indicate that the focal results are qualitatively equivalent for samples of 2398 zip codes or more. For smaller samples, results differ somewhat likely because the distribution of demographics in the sample becomes more idiosyncratic.

The second set of analyses focuses on the selection of the number of products. The set of all unique UPCs in the data set is identified and draw from it five random samples of different sizes. All observations are selected associated with those random samples of UPCs. FIG. 8 illustrates a table of the selection of the number of products in the subject sample data set. The estimation results that appear in FIG. 8 indicate that the focal results are qualitatively equivalent for samples of 4525 UPCs or more.

It appears advisable to include at least about 4,000 UPCs and about 2,000 zip codes in the sample.

4 Further Applications and Conclusions

In an empirical context, it is perceived that disparities are a problem, for example, in grocery retailing. In such context, pricing is thought to be a common tool for discrimination. One approach as presently disclosed involves considering the continental U.S. market and at least one major retailer (initially). Presently disclosed methodology further may relate to creating a random sample of zip codes with balanced demographics, considering Average income, Income Gini (Gini Index is a summary measure of income inequality, where the Gini coefficient incorporates the detailed shares data into a single statistic, which summarizes the dispersion of income across the entire income distribution), and Proportions of minority groups. Other demographics that define protected groups, such as age and gender, can be considered as well.

Per presently disclosed methodology, one can write a crawler that impersonates consumers from each zip code, while making it a custom crawler designed to avoid detection by controlling fingerprinting and tracking practices. The design of the crawler is intended to identify all products and collects prices (such as grocery prices) in each zip code. Given the large number of zip codes in the US, a random sampling approach is practiced for collecting grocery prices. For example, data may be generated which is a sample at random from lists of 18,303 UPCs (Universal Price Codes) and 3,338 zip codes. Price sampling is conducted at focal and neighboring zip codes. In one example, sampling was done for a period of time such as Aug. 14, 2021 to Oct. 17, 2021 for 7,171 zip codes and 636 CBSAs (CBSA means a core-based statistical area comprising a U.S. geographic area defined by the Office of Management and Budget (OMB) that consists of one or more counties (or equivalents)

anchored by an urban center of at least 10,000 people plus adjacent counties that are socioeconomically tied to the urban center by commuting). For these analysis, we use a subset of the data set for which cost variables are available, with a total of n=829,483.

a next presently disclosed step may be to determine whether there is a valid interest encompassed by any perceived disparities. Examples of valid interests are costs, local laws, and competition. One can determine whether disparities vanish when controlling, for example, for:

Delivery costs

CBSA unobservables (economic-oriented unobservable variables such as expectations, beliefs, spirits, degrees of risk aversion, information, entrepreneurship and others directly non-measurable concepts which play an important role in determining the decisions of economic agents)

Zip code property prices, demographics

Zip code store counts and online sales (from third party providers)

FIG. 9 illustrates a table of the relationship between product prices and demographic variables from data set aggregated at the zip3 level (the first three digits of the 5-digit ZIP code). In this example, the proportion of low-income consumers is replaced with the Gini index of income inequality and the proportion of native households is included. Four sets of relationships are presented in four columns. The first set considers only the demographics of interest as in example above. The second set accounts for differences across CBSAs to remove price differences caused by valid interests such as labor costs and cost of goods sold. The third set of relations also controls for other costs such as delivery costs, real estate costs, and the degree of competition from other retailers. The fourth and last set of relationships accounts for demand by including product sales volume into the model. Because demographic variables exhibit statistically significant relationships with prices, one can conclude that such differences are not fully explained by valid interests.

Another step can be to determine whether any perceived disparities are the result of price personalization. If disparities (via internet based sales) are caused by profit-maximizing personalization, they are not regarded as a valid interest. Brick-and-mortar prices are not personalized. Therefore, comparative analysis may be conducted by replicating analysis with brick-and-mortar prices, based on the same retailer, same products, and same zip3's. FIG. 10 illustrates a table of the relationship between product prices and demographic variables from another data set considered per presently disclosed subject matter, with the table representing aggregation at the same zip3 level as in FIG. 9 (the first three digits of the 5-digit ZIP code) but with all analysis replicating data from brick-and-mortar prices instead of internet pricing.

Another consideration to weigh is whether there is data scarcity. As generally understood, minority consumers are relatively few and more prone to buy niche products. If transaction data are limited, models are poor. If algorithm underperforms because of data scarcity, disparities should affect only infrequent products. An analytical approach to account for such circumstances would be to use online sales per capita as a proxy for data volume, and split the sample. FIG. 11 illustrates a table of the relationship between product prices and demographic variables from another data set considered per presently disclosed subject matter, with the table representing use of online sales per capita as a proxy for data volume, and with the sample split as represented in the table.

Generally speaking, conclusions on such data sets are that they show there is disparate impact, there is some evidence that valid interests explain disparities only partially, personalization is responsible, and there is partially a data problem. Other potential explanations for disparate data could relate to such as crime rates or search costs.

This disclosure presents a new platform designed to collect online-retailing pricing data that can be matched to consumer demographics. Unlike previously proposed approaches, the platform presently disclosed relies on a random sampling design to cover a large spectrum of products with high geographic granularity. The high geographic granularity of the data facilitates matching it with readily-available demographic data to assess the possibility of disparate impact across demographic groups.

To illustrate this, the disclosure reports the results of several analyses of data collected by the platform. The results indicate that online retailing algorithms can indeed cause disparate impact across socioeconomic and racial groups. Disparate impact is partly associated with pricing policies and partly associated with recommendation policies.

This written description uses examples to disclose the presently disclosed subject matter, including the best mode, and also to enable any person skilled in the art to practice the presently disclosed subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural and/or step elements that do not differ from the literal language of the claims, or if they include equivalent structural and/or elements with insubstantial differences from the literal languages of the claims.

REFERENCES

[1] Rafael Becerril-Arreola, Randolph E. Bucklin, and Raphael Thomadsen. 2021. Effects of income distribution changes on assortment size in the mainstream grocery channel. *Management Science* (2021).

[2] Alberto Cavallo. 2017. Are online and offline prices similar? Evidence from large multi-channel retailers. *American Economic Review* 107, 1 (2017), 283-303.

[3] Kerwin Kofi Charles, Erik Hurst, and Melvin Stephens. 2008. Rates for vehicle loans: Race and loan source. *American Economic Review* 98, 2 (2008), 315-20.

[4] Le Chen, Alan Mislove, and Christo Wilson. 2016. An empirical analysis of algorithmic pricing on amazon marketplace. In *Proceedings of the 25th international conference on World Wide Web*. 1339-1349.

[5] Elizabeth Eisenhauer. 2001. In poor health: Supermarket redlining and urban nutrition. *GeoJournal* 53, 2 (2001), 125-133.

[6] Aniko Hannak, Gary Soeller, David Lazer, Alan Mislove, and Christo Wilson. 2014. Measuring price discrimination and steering on e-commerce websites. In *Proceedings of the 2014 conference on internet measurement conference*. 305-318.

[7] Thomas Hupperich, Dennis Tatang, Nicolai Wilkop, and Thorsten Holz. 2018. An empirical study on online price differentiation. In *Proceedings of the Eighth ACM Conference on Data and Application Security and Privacy.* 76-83.

[8] Costas Iordanou, Claudio Soriente, Michael Sirivianos, and Nikolaos Laoutaris. 2017. Who is fiddling with prices? building and deploying a watchdog service for e-commerce. In *Proceedings of the Conference of the ACM Special Interest Group on Data Communication.* 376-389.

[9] Anja Lambrecht and Catherine Tucker. 2019. Algorithmic bias? An empirical study of apparent gender-based discrimination in the display of STEM career ads. *Management Science* 65, 7 (2019), 2966-2981.

[10] Timothy Lee. 2019. Web scraping doesn't violate anti-hacking law, appeals court rules. *Ars Technica* (2019).

[11] Timothy Lee. 2020. Court: Violating a site's terms of service isn't criminal hacking. *Ars Technica* (2020).

[12] Jakub Mikians, Laszlo Gyarmati, Vijay Erramilli, and Nikolaos Laoutaris. 2012. Detecting price and search discrimination on the internet. In *Proceedings of the 11th ACM workshop on hot topics in networks.* 79-84.

[13] Ferdinando Monte, J Bradford Jensen, and Sumit Agarwal. 2020. *Consumer Mobility and the Local Structure of Consumption Industries.* Technical Report DP12150. Centre for Economic Policy Research.

[14] Fiona Scott Morton, Florian Zettelmeyer, and Jorge Silva-Risso. 2003. Consumer information and discrimination: Does the internet affect the pricing of new cars to women and minorities? *Quantitative marketing and Economics* 1, 1 (2003), 65-92.

[15] Nico Neumann, Catherine E Tucker, and Timothy Whitfield. 2019. How effective is third-party consumer profiling? Evidence from field studies. *Marketing Science* 38, 6 (2019), 918-926.

[16] Ziad Obermeyer, Brian Powers, Christine Vogeli, and Sendhil Mullainathan. 2019. Dissecting racial bias in an algorithm used to manage the health of populations. *Science* 366, 6464 (2019), 447-453.

[17] Debabrata Talukdar. 2008. Cost of being poor: Retail price and consumer price search differences across inner-city and suburban neighborhoods. *Journal of Consumer Research* 35, 3 (2008), 457-471.

[18] Michael Trusov, Liye Ma, and Zainab Jamal. 2016. Crumbs of the cookie: User profiling in customer-base analysis and behavioral targeting. *Marketing Science* 35, 3 (2016), 405-426.

[19] Antoine Vastel, Walter Rudametkin, Romain Rouvoy, and Xavier Blanc. 2020. FP-Crawlers: studying the resilience of browser fingerprinting to block crawlers. In *MADWeb '20-NDSS Workshop on Measurements, Attacks, and Defenses for the Web.*

[20] David Zeber, Sarah Bird, Camila Oliveira, Walter Rudametkin, Ilana Segall, Fredrik Wollsen, and Martin Lopatka. 2020. The representativeness of automated web crawls as a surrogate for human browsing. In *Proceedings of The Web Conference* 2020. 167-178.

What is claimed is:

1. Methodology for the collection of data required to study the extent to which pricing algorithms in internet markets may induce disparities across demographic consumer groups, without collecting or storing the demographic data of the internet market consumers, comprising:
   providing a first internet crawler comprising one or more processors programmed to:
   open a targeted retailer's main web page and then recursively crawl through all products in at least one selected category of products,
   build a tree of all products available in the at least one selected category, and
   collect and store the https addresses of the product pages of all products in the at least one selected category; and
   providing a second internet crawler comprising one or more processors programmed to:
   receive the collected https addresses of the product pages from the first internet crawler,
   collect and store pricing data from a relatively large number of a plurality of locations of the targeted retailer, including from a first of the plurality of locations of the targeted retailer,
   close an associated browser,
   delete its browsing history and cookies,
   recursively perform such collect, store, close, and delete sequencing for each of the remainder of the plurality of locations of the targeted retailer, for the stored pricing data associated with the respective plurality of locations of the targeted retailer to be subsequently analyzed for disparate impact (DI), to detect pricing algorithm bias while protecting consumer privacy, and
   collect pricing data across multiple locations, using independent threads which are run asynchronously in parallel, with each thread based on a randomly selected focal zip code from all of the zip codes and its identified neighboring zip codes, so that for each focal zip code a new browser session is created using a browser selected at random; and
   wherein the one or more processors comprising the first and second internet crawlers are further programmed to operate a plurality of browsing sessions run in parallel using multi-threading.

2. The methodology according to claim 1, wherein:
   the respective plurality of locations of the targeted retailer comprise a relatively large number of relatively small geographic areas respectively associated with zip codes; and
   the methodology further comprises providing one or more analysis processors programmed to respectively match the zip code associated stored pricing data with public data sources of consumer demographic data for the corresponding zip codes.

3. The methodology according to claim 2, wherein the public data sources comprise at least one of the U.S. Census Bureau, the U.S. IRS, and large scale publicly available surveys.

4. The methodology according to claim 1, wherein:
   the one or more processors comprising the first internet crawler are further programmed to collect the https addresses of the product pages of all products in all categories available via the targeted retailer's main web page; and
   the one or more processors comprising the second internet crawler are further programmed to:
   receive the latest collected https addresses of the product pages of all the available categories from the first internet crawler,
   collect and store pricing data from a focal zip code of the targeted retailer, and
   subsequently collect and store pricing data from zip codes surrounding the focal zip code of the targeted retailer.

5. The methodology according to claim 4, wherein the one or more processors comprising the second internet crawler are further programmed to operate in a first mode to:
   select a random set of categories from all of the available categories from the first internet crawler, and
   select random products from within each of the selected random set of categories.

6. The methodology according to claim 4, wherein the one or more processors comprising the first and second internet crawlers are further programmed to operate in a second mode to:
   select a random set of categories from all of the available categories from the first internet crawler,
   perform a search with each name of the random set of categories in the search box,
   create a list of the top search results and load their pages one at time,
   select a focal zip code at random from the plurality of locations, and
   collect and store the price of the product at locations of retailers within the randomly selected focal zip code, for subsequent analysis to assess whether the zip code determined to what products consumers were steered.

7. The methodology according to claim 1, wherein the one or more processors comprising the first and second internet crawlers are further programmed to:
   restart periodically to free memory lost through operations.

8. The methodology according to claim 1, wherein the one or more processors comprising the first and second internet crawlers are further programmed to at least one of randomly delay between discrete operations thereof and to randomly scroll the pages navigated, to avoid pattern detection by anti-crawler features of targeted retailer's websites.

9. The methodology according to claim 2, wherein the one or more analysis processors are further programmed to combine data from the first and second internet crawlers with public data from the U.S. Census Bureau, including data to obtain zip code-level data on the average income, the number of households by ethnicity, and the total number of households units, to yield determinations for the proportions of households reported as African American (PROPBLACK), Hispanic (PROPHISP), Asian (PROPASIAN), and the average income in thousands of dollars (AVINCK), used to assess whether varying collected price data prices are correlated with consumer demographics.

10. The methodology according to claim 9, wherein the one or more analysis processors are further programmed to combine data from the first and second internet crawlers with public data from the U.S. IRS, including data to obtain zip code-level data on the total number of tax returns and the number of tax returns by adjusted gross income (AGI) brackets, to yield determination of the proportion of returns reporting AGI below $25,000 to regard it as the proportion of low-income consumers (PROPLOWINC).

11. The methodology according to claim 10, wherein the one or more analysis processors are further programmed to assess disparate impact across demographic groups defined by income and race, by splitting the sample data at the median of each demographic variable and labelling observations in each group as either "low" or "high", wherein observations in the "low" group correspond to zip codes with average income below the median, and observations in the "high" group correspond to zip codes with above-median average income, and with the average product price computed for each group.

12. The methodology according to claim 11, wherein the one or more analysis processors are further programmed to quantify price differences associated with a particular demographic variable while holding constant product assortment and other demographics, using multiple regression analysis.

13. The methodology according to claim 12, wherein the one or more analysis processors are further programmed for the multiple regression analysis to comprise operating a regression estimation model that explains product prices as a function of consumer demographics, as the equation:

$$PRICE_{zj} = \tau_j + \beta_1 AVINCK_z + \beta_2 PROPLOWINC_z + \beta_3 PROPBLACK_z + \beta_4 PROPHISP_z + \beta_5 PROPASIAN_z + \epsilon_{zj},$$

where z indexes zip codes, j indexes UPCs, and the parameters $T_j$ are product-specific fixed effects that account for the variation in prices that is associated with the products available locally.

14. The methodology according to claim 12, wherein the one or more analysis processors are further programmed to separate the effects of the pricing algorithm of a retailer from those of the recommendation system of the retailer, the sample data is split into the set of products selected randomly from the pool and the set of products recommended by the retailer's recommendation system, and then a regression estimate model is re-estimated using each of the samples and the results are output.

15. Methodology to assess the existence of disparate impact in internet markets that serve geographically dispersed consumers, by impersonating the geographically dispersed consumers to elicit and capture the behaviors of algorithms on large scale for statistical analysis, without collecting or storing the demographic data of the internet market consumers, comprising:
   providing first and second internet crawlers comprising one or more processors programmed to automate page requests and navigation relative to at least one targeted online retailer in ways that mimic the typical browsing behaviors of real consumers in a respective plurality of locations; wherein
   the one or more processors comprising the first internet crawler are further programmed to:
      open a targeted retailer's main web page and then recursively crawl through all grocery products in all available categories of grocery products,
      build a tree of all grocery products available in all available categories, and
      collect and store the https addresses of the product pages of all grocery products in all available categories; and
   the one or more processors comprising the second internet crawler are further programmed to operate in a first mode to:
      receive the collected https addresses of the grocery product pages from the first internet crawler,
      select a random set of categories from all of the available categories from the first internet crawler,
      select random grocery products from within each of the selected random set of categories,
      open the targeted retailer's main web page and then recursively crawl through all randomly selected grocery products in the randomly selected set of available categories of grocery products,
      collect and store pricing data for each of the randomly selected grocery products of the targeted retailer browsing as if from the respective plurality of locations, close an associated browser,
delete its browsing history and cookies,
recursively perform such collect, store, close, and delete sequencing for each of the remainder of the plurality of locations of the targeted retailer, and
collect pricing data across multiple locations, using independent threads which are run asynchronously in parallel, with each thread based on a randomly selected focal zip code from all of the zip codes and its identified neighboring zip codes, so that for each focal zip code a new browser session is created using a browser selected at random, and
wherein the respective plurality of locations comprise a relatively large number of relatively small geographic areas respectively associated with zip codes; and
the methodology further comprises providing one or more analysis processors programmed to respectively match the zip code associated stored pricing data with public data sources of consumer demographic data for the corresponding zip codes to be subsequently analyzed for disparate impact (DI), to detect pricing algorithm bias while protecting consumer privacy; and
the one or more processors comprising the first and second internet crawlers are further programmed to operate a plurality of browsing sessions run in parallel using multi-threading.

16. Methodology according to claim 15, wherein the number of grocery products randomly selected are represented by at least about 4,000 UPCs, and the relatively large number of relatively small geographic area correspond with at least about 2,000 zip codes.

17. The methodology according to claim 15, wherein:
the one or more processors comprising the first internet crawler are further programmed to collect the https addresses of the product pages of all products in all categories available via the targeted retailer's main web page; and
the one or more processors comprising the second internet crawler are further programmed to:
receive the latest collected https addresses of the grocery product pages of all the available categories from the first internet crawler,
collect and store pricing data from a focal zip code of the targeted retailer, and
subsequently collect and store pricing data from zip codes surrounding the focal zip code of the targeted retailer.

18. The methodology according to claim 15, wherein the one or more processors comprising the first and second internet crawlers are further programmed to operate in a second mode to:
select a random set of categories from all of the available categories from the first internet crawler,
perform a search with each name of the random set of categories in the search box,
create a list of the top search results and load their pages one at time,
select a focal zip code at random from the plurality of locations, and
collect and store the price of the product at locations of retailers within the randomly selected focal zip code, for subsequent analysis to assess whether the zip code determined to what products consumers were steered.

19. An electronic platform for the collection of data required to study the extent to which pricing algorithms in internet markets may induce disparities across demographic consumer groups, without collecting or storing the demographic data of the internet market consumers, comprising:
a first internet crawler comprising one or more processors programmed to:
open a targeted retailer's main web page and then recursively crawl through all products in at least one selected category of products,
build a tree of all products available in the at least one selected category, and
collect and store the https addresses of the product pages of all products in the at least one selected category;
a second internet crawler comprising one or more processors programmed to:
receive the collected https addresses of the product pages from the first internet crawler,
collect and store pricing data from a relatively large number of a plurality of locations of the targeted retailer respectively associated with zip codes, including from a first of the plurality of locations of the targeted retailer, for the stored pricing data associated with the respective zip codes to be subsequently analyzed for disparate impact (DI),
close an associated browser,
delete its browsing history and cookies,
recursively perform such collect, store, close, and delete sequencing for each of the remainder of the plurality of locations of the targeted retailer, and
collect pricing data across multiple locations, using independent threads which are run asynchronously in parallel, with each thread based on a randomly selected focal zip code from all of the zip codes and its identified neighboring zip codes, so that for each focal zip code a new browser session is created using a browser selected at random;
the one or more processors comprising the first and second internet crawlers are further programmed to operate a plurality of browsing sessions run in parallel using multi-threading; and
one or more analysis processors programmed to respectively match the zip code associated stored pricing data with public data sources of consumer demographic data for the corresponding zip codes, to detect pricing algorithm bias while protecting consumer privacy.

20. The electronic platform according to claim 19, wherein the public data sources comprise at least one of the U.S. Census Bureau, the U.S. IRS, and large scale publicly available surveys.

21. The methodology according to claim 20, wherein:
the one or more processors comprising the first internet crawler are further programmed to collect the https addresses of the product pages of all products in all categories available via the targeted retailer's main web page; and
the one or more processors comprising the second internet crawler are further programmed to:
receive the latest collected https addresses of the product pages of all the available categories from the first internet crawler,
collect and store pricing data from a focal zip code of the targeted retailer, and
subsequently collect and store pricing data from zip codes surrounding the focal zip code of the targeted retailer.

22. The methodology according to claim 21, wherein the one or more processors comprising the second internet crawler are further programmed to operate in a first mode to:

select a random set of categories from all of the available categories from the first internet crawler, and select random products from within each of the selected random set of categories.

23. The methodology according to claim 21, wherein the one or more processors comprising the first and second internet crawlers are further programmed to operate in a second mode to:

select a random set of categories from all of the available categories from the first internet crawler, perform a search with each name of the random set of categories in the search box, create a list of the top search results and load their pages one at time, select a focal zip code at random from the plurality of locations, and collect and store the price of the product at locations of retailers within the randomly selected focal zip code, for subsequent analysis to assess whether the zip code determined to what products consumers were steered.

\* \* \* \* \*